US006261525B1

(12) United States Patent
Minaee

(10) Patent No.: US 6,261,525 B1
(45) Date of Patent: Jul. 17, 2001

(54) PROCESS GAS DECOMPOSITION REACTOR

(76) Inventor: Bruce Minaee, 607 Airpak Rd., Ste. B, Napa, CA (US) 94558

(*) Notice: Subject to any disclaimer, the term of this patent is extended or adjusted under 35 U.S.C. 154(b) by 0 days.

(21) Appl. No.: 09/572,111

(22) Filed: May 17, 2000

(51) Int. Cl.[7] .................................................. B01J 19/08
(52) U.S. Cl. .............................................. 422/186; 219/678
(58) Field of Search ............................... 422/186; 219/678

(56) References Cited

U.S. PATENT DOCUMENTS

| 3,603,991 | * | 9/1971 | Berstein ............................. 342/204 |
| 4,945,721 | | 8/1990 | Cornwell et al. ..................... 60/274 |
| 5,668,442 | * | 9/1997 | Goebel et al. ......................... 315/39 |
| 5,804,007 | | 9/1998 | Asano ..................................... 156/72 |
| 5,807,526 | | 9/1998 | Miljevic ............................... 422/174 |
| 5,902,404 | | 5/1999 | Fong et al. ........................... 118/723 |
| 5,965,786 | | 10/1999 | Rostaing et al. ..................... 588/210 |

* cited by examiner

Primary Examiner—Kathryn Gorgos
Assistant Examiner—Thao Tran
(74) Attorney, Agent, or Firm—Thomas Schneck

(57) ABSTRACT

A process gas decomposition reactor featuring two intertwined helical coils surrounding a gas flow path. Each of the two coils is energized by a separate magnetron having an associated waveguide and an inductive structural element which couples the microwave energy into the coil. The magnetic flux lines from the coil serve to confine ions and electrons within the coil, causing collisions and hence ionization of gas entering a flow path through the coil. The gas, containing HFCs and PFCs is broken down by such collisions with ions and electrons within the gas plasma. The gas displaced at the end of the coil contains decomposition products from the HFCs and PFCs.

24 Claims, 5 Drawing Sheets

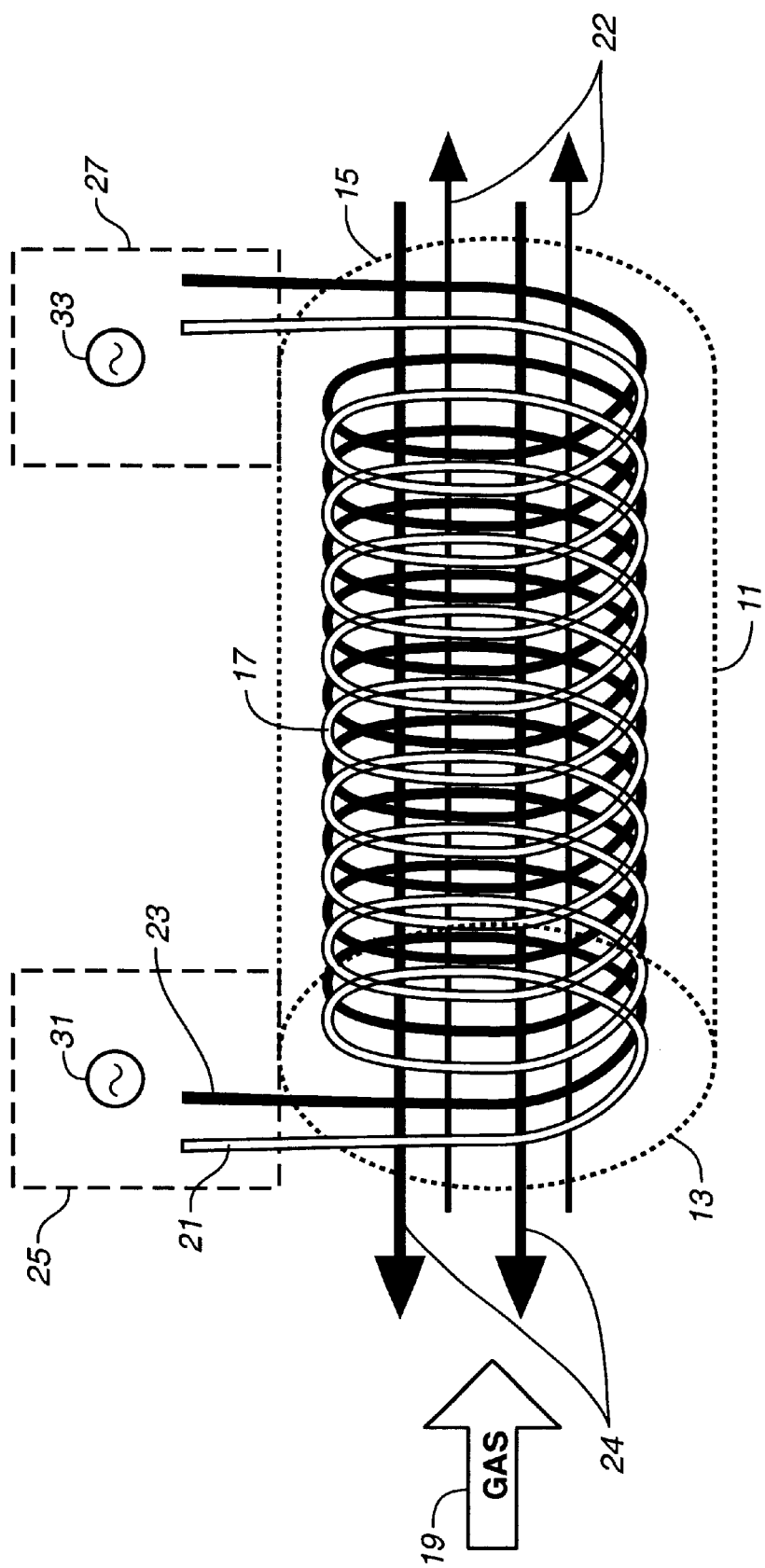
FIG._1

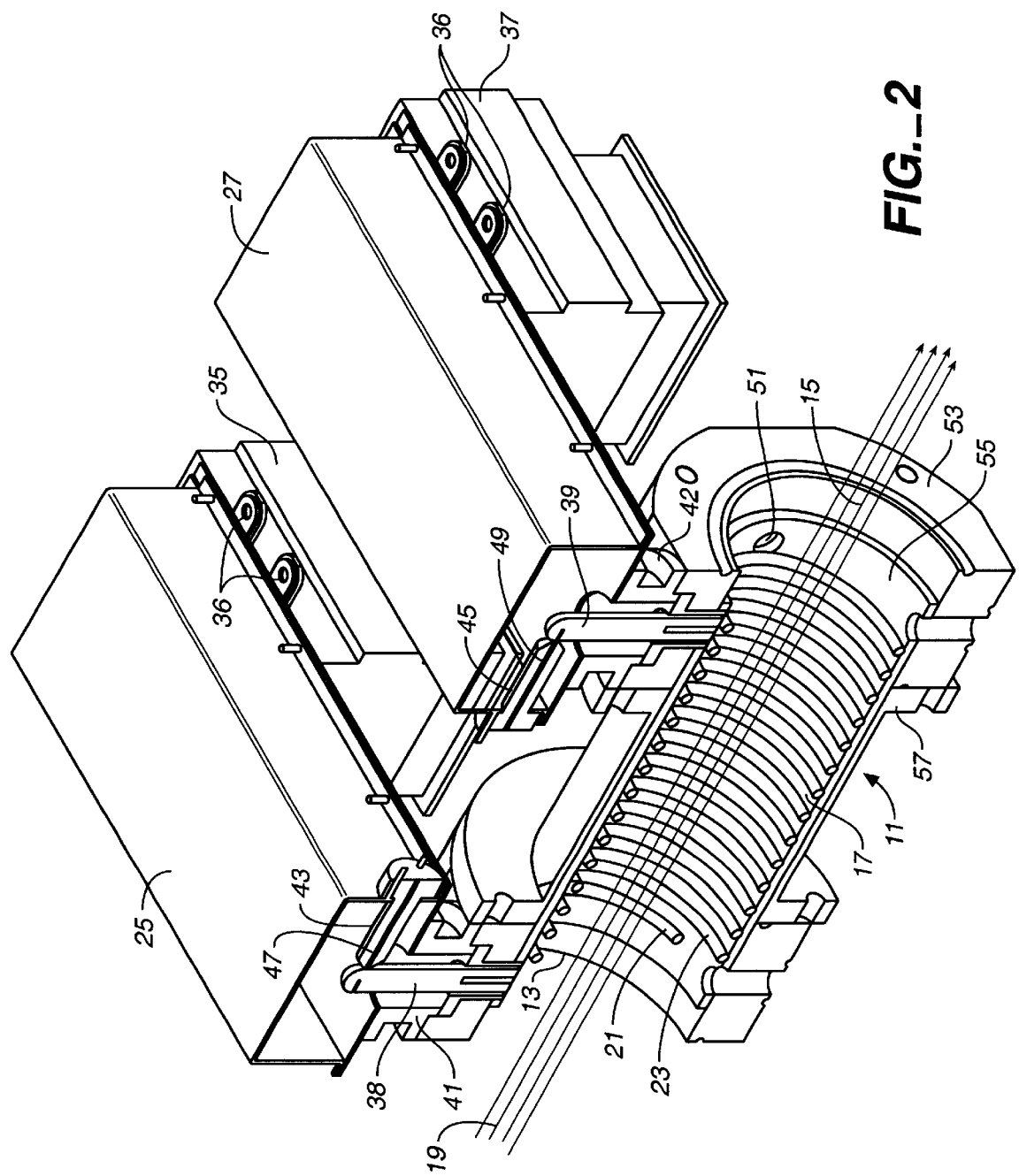
FIG._2

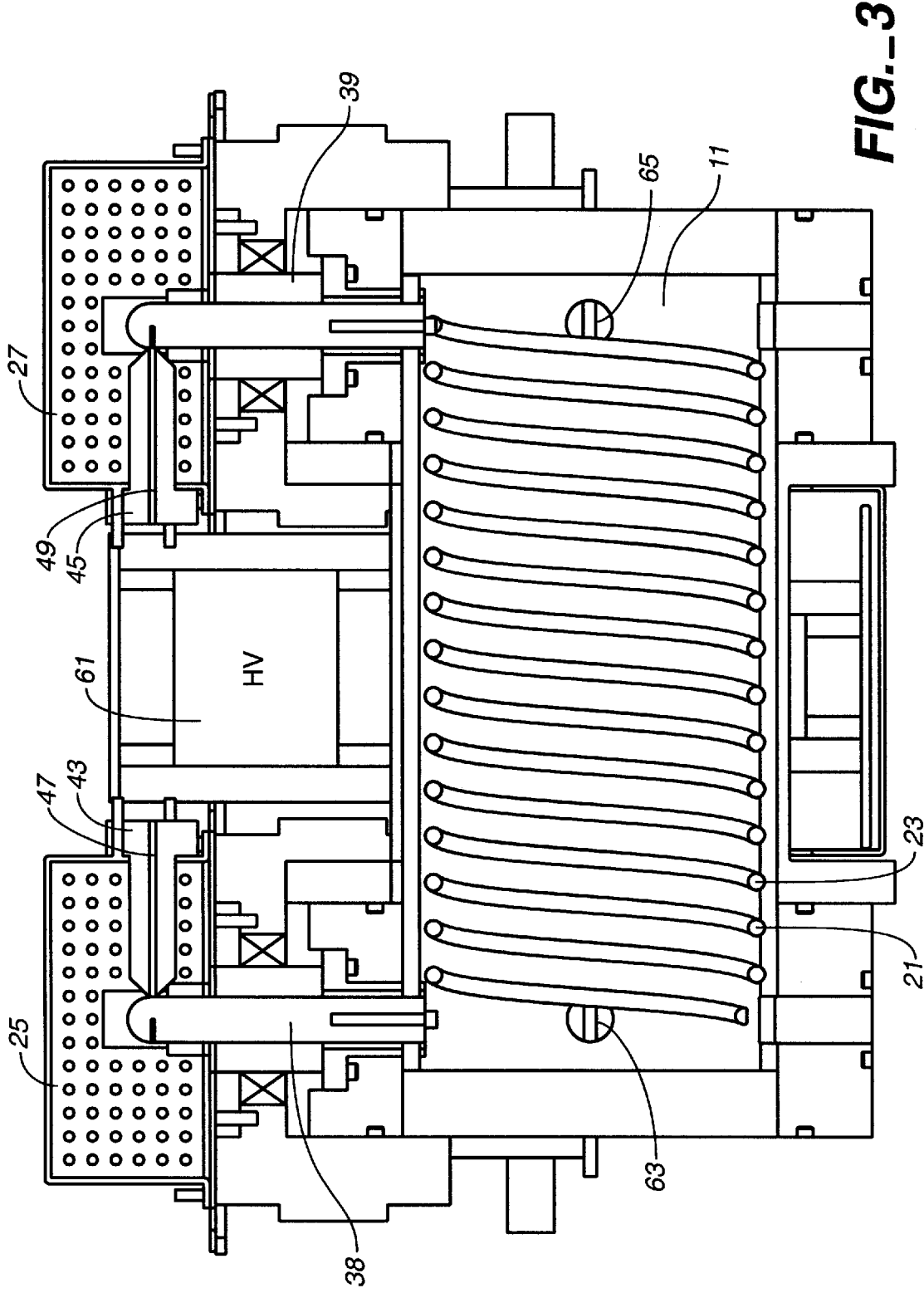
FIG._3

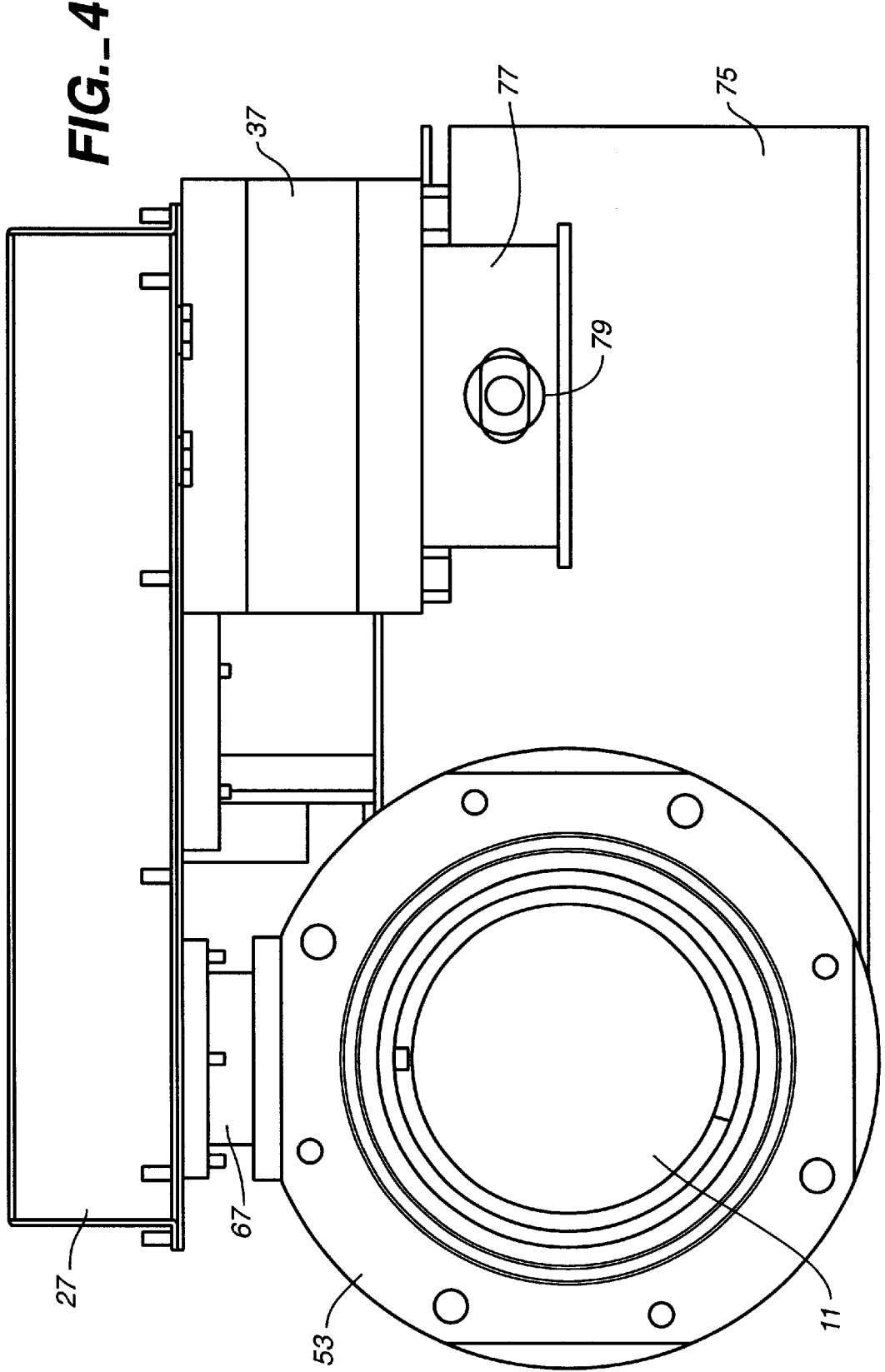

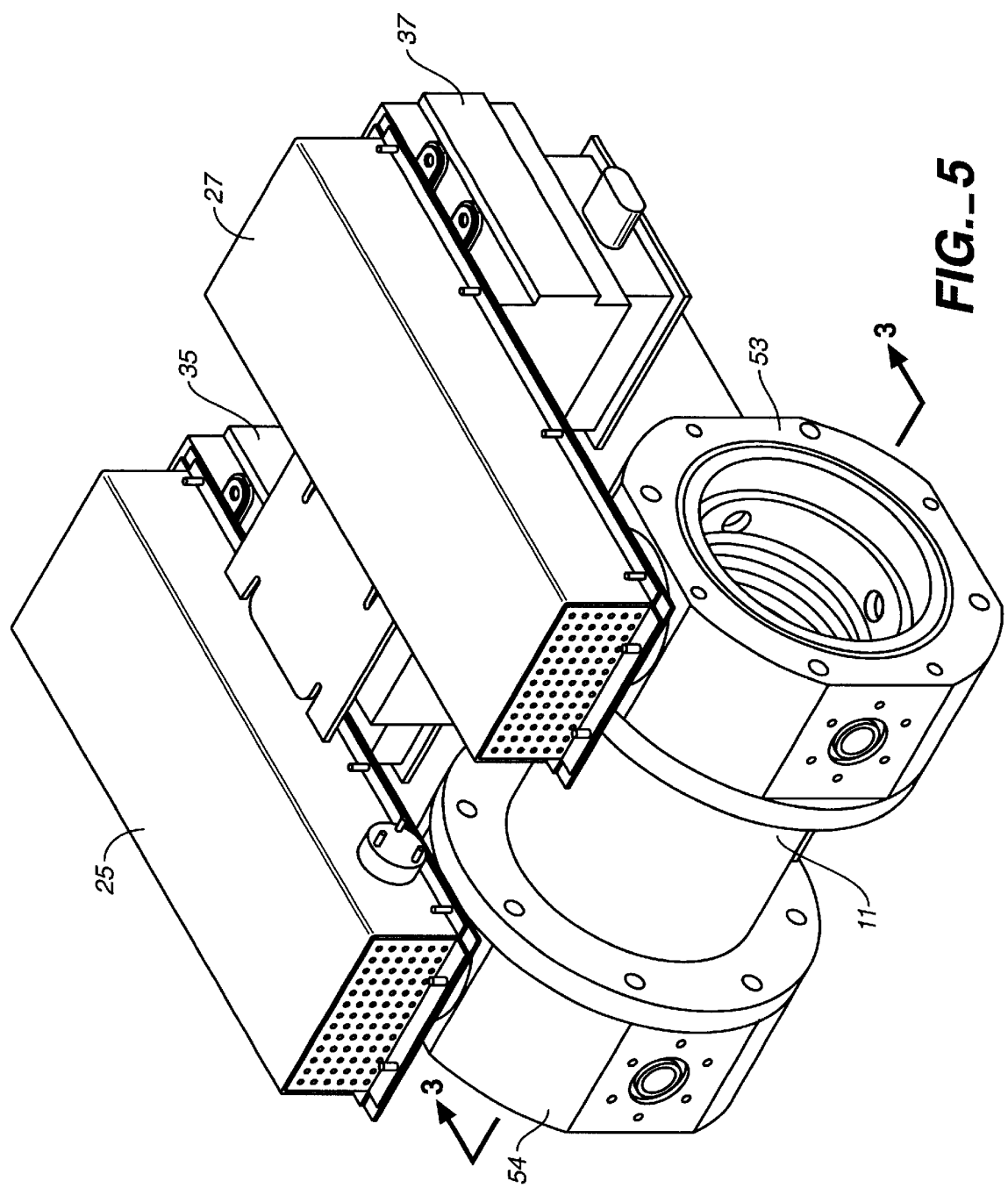
FIG._5

PROCESS GAS DECOMPOSITION REACTOR

TECHNICAL FIELD

The invention relates to a gas decomposition reactor and, more particularly, to a reactor for decomposing greenhouse gases emitted by semiconductor wafer processing tools.

BACKGROUND ART

Certain organic gases known as perfluorinatedcarbons (PFCs) and hydrofluorocarbons (HFCs), emitted by industrial processes, particularly semiconductor process tools, trap infrared radiation in the atmosphere, contributing to the greenhouse effect. These gases can also decompose in the upper atmosphere where highly reactive fluorine and fluorine compounds are liberated. These interact and react with ozone, generally causing the ozone to become molecular oxygen and enter reactions forming stable compounds. There is a net removal of ozone from the atmosphere in the ozone layer, a region of the atmosphere from 18 to 48 km (12 to 30 mi) above the earth's surface. Some scientists have predicted that foreseeable destruction of the ozone layer will cause increases in ultraviolet radiation with negative health effects, damage to certain crops and to plankton and the marine food web, with an accompanying increase in carbon dioxide due to the decrease in plants and plankton. The increase in carbon dioxide gives rise to global warming because a sufficiently thick layer of carbon dioxide will also trap infrared radiation which is normally radiated away from the earth after solar heating of the earth's surface by the sun, giving rise to the "greenhouse effect".

PFCs and HFCs are greenhouse gases because of their strong infrared absorption cross sections and long atmospheric lifetimes, when not in the upper atmosphere. Thus, PFCs and HFCs behave similar to CO2 in trapping heat and causing the greenhouse effect. Because of their potential long term impact on the global climate, PFC's, HFC's, NF3 and SF6 have specifically been included in Kyoto Protocol, which aims to significantly reduce the rate of global warming gas emissions into the atmosphere.

In summary, PFCs and HFCs get trapped in the atmosphere causing an increase in the earth's temperature. Secondly, these gases absorb atmospheric UV radiation in the upper atmosphere and break down to elemental materials, including fluorine atoms, which then deplete the ozone layer. Hence, there is a danger of exposure to high levels of UV radiation on the earth's surface, causing a decrease in plants and plankton and increasing levels of atmospheric carbon dioxide, a greenhouse gas.

In U.S. Pat. No. 5,965,786 J. C. Rostaing et al. disclose use of an atmospheric pressure gas plasma for destroying PFCs and HFCs thereby eliminating greenhouse gases before the gases are released to the atmosphere. The plasma is generated by a microwave source, directing energy down a waveguide to a dielectric discharge tube where the plasma resides. Process gas is fed into the discharge tube where the PFCs and HFCs are decomposed by collisions with high energy electrons.

In U.S. Pat. No. 5,902,404 G. Fong et al. disclose use of a chamber that is open to microwave energy from a waveguide. The chamber and waveguide are operated as a resonant cavity to produce an ionized gas plasma. The purpose of the chamber is to excite a process gas for use with semiconductor manufacturing equipment where thin films are deposited on wafers.

An object of the invention was to decompose PFCs and HFCs in a discharge tube compatible with process gas handling, particularly in the semiconductor manufacturing industry.

SUMMARY OF THE INVENTION

The above object has been achieved with a gas flowthough reactor generating a plasma for decomposition of perfluorocarbon and hydrofluorocarbon compounds in a process gas stream emerging from a process tool. The reactor features a pair of magnetrons feeding a pair of launching waveguides to a pair of helical coils forming a microwave induction structure within a plasma chamber coaxial with the gas flow path. Each magnetron has a microwave power source or generator that typically operates at an industrial frequency of 2450 MHz. Each magnetron is electrically coupled to one of a pair of antennae. One of the pair of antennae extends into one waveguide and the second of the pair of antennae extends into the other waveguide.

Each waveguide forms an elongate chamber resonant cavity and within each elongate chamber is a tuning stub. The tuning stubs are aluminum rods that minimize the reflected microwave energy so that the maximal microwave power may be applied to the plasma chamber. The position and size of the tuning stubs may be adjusted depending upon the components and parameters of the system as will be described below. The resonant cavities stabilize the magnetron oscillator frequency.

At the end of each waveguide elongate chamber closest to the plasma chamber a waveguide-to-applicator transition component, a core, is coupled to an impedance transformer. The cores couple the energy from the waveguides into the transformers and thence into the plasma chamber via a pair of intertwined, oppositely wound helical coils forming a helical induction structure.

The plasma chamber has a housing surrounding the coils and is formed of a metal such as aluminum. An insulating jacket is disposed within the outer housing of the chamber. The insulating jacket comprises a ceramic tube that provides a surface for catalytic conversion. In one embodiment the surface of the tube comprises a material that is flame polished. The insulating jacket may be made of other dielectric materials and may have other cross sectional shapes such as square.

The helical induction structure has a first and a second coaxial conductive helical coil. Each coil is intertwined within the other, within the insulating jacket. By "intertwined" is meant that the two coils are wound in parallel but insulated from each other. Thus two separate helical coils exist in side-by-side relation. The two coils carry current in opposite directions. The induction structure is formed from any conductive metallic surface that may be used for catalyzing reactions.

The microwave energy from each of the transformers is directed to the helical induction structure from two microwave oscillator sources via the two cores. Therefore, one microwave energy source does not affect the other source directly, but one source may stabilize the other by a crosscoupling effect explained below.

Since a gas discharge can be sustained under a variety of process conditions, it is inherently more advantageous to initially ignite the plasma at a predetermined condition and then maintain this plasma as operating conditions change based on other parameters of the process, for example, flow, pressure, residence time, etc. This ignition is provided by high voltage sparks applied to each coil through common components of the microwave energy delivery system, namely, waveguides, impedance matching transformers and helical coils.

The plasma chamber also comprises an inlet and outlet openings through which reactant and additive gases enter the chamber and exit the chamber. The openings are through flanges which mate with corresponding flanges in a process gas stream of a process tool.

Examples of reactant gases are additive gases such as oxygen, hydrogen or water vapor. The gases enter the plasma chamber through a standard vacuum flange, are dispersed, and after decomposition reactions of the hydrofluorocarbonated compounds and perfluorocarbonated compounds have taken place the gases are evacuated through directly mounted flanges at the inlet and the outlet of the plasma chamber.

Decomposition reactions occur once the helical induction structure has been energized and the reactant and additive gases have been added. The energized helical induction structure which has microwave energy delivered to it from two sources produces two oppositely directed fields that polarize in opposite directions. As the fields of sufficient strength are built in the microwave cavity, a gas plasma is generated, causing a net gain in high energy electrons. The high energy electrons create large numbers of ion pairs and excited molecules. The ions and excited molecules react with the additive gases oxygen, hydrogen and water vapor to form free radicals which react with the fluorinated compounds and decompose them. In particular, in one decomposition reaction, C2F6 is decomposed without any CF4 production. This is important because CF4 is also a greenhouse gas.

The microwave plasma system is equipped with various sensors. There are sensors for measuring the voltage and current of the magnetrons, the temperature of the magnetrons core, the microwave power as it is generated and after it is reflected, the total gas pressure within the plasma chamber, the gas pressure of individual gases within the chamber, the relative quantity of different species within the plasma and plasma parameters such as plasma density and electron temperature or the electron energy distribution function.

BRIEF DESCRIPTION OF THE DRAWINGS

FIG. 1 is a plan view of a microwave energy induction structure in accordance with the present invention.

FIG. 2 is a perspective cutaway view of a process gas decomposition reactor in accordance with the present invention using the microwave energy induction structure of FIG. 1.

FIG. 3 is a side sectional view of the apparatus of FIG. 5 taken along line 3—3.

FIG. 4 is an end elevation of the apparatus of FIG. 2.

FIG. 5 is a perspective non-cutaway view of the apparatus of FIG. 2.

DESCRIPTION OF THE BEST MODE

With reference to FIGS. 1 and 2 a chamber 11 is shown having a gas inflow port 13 and a gas outflow port 15. The diameter of input port 13 should match the diameter of the outlet port of a process tool so that a gas flow stream 19 will enter the inflow port 13 without generation of a significant back pressure. It is intended that the process gas decomposition reactor shown in FIGS. 1 and 2 be part of, or connected to, the process gas tools used in industry, particularly the semiconductor manufacturing industry.

The gas flow stream 19 flows into the central region 17 where field lines 22, arising from the first intertwined coil 21 cause restriction of motion of ions and electrons to the immediate vicinity of the field lines. Gases are ionized by collision with these electrons and ions, thereby causing PFCs and HFCs to decompose. A reactant gas or gases, such as hydrogen, oxygen or water vapor, is introduced into the chamber to facilitate formation of reactions with the decomposed constituents of the PFCs and HFCs. The reactant gases are metered by flow controllers and are dispersed symmetrically through the chamber by injection at the gas inlet port, as well as the gas outflow port. The field lines 24, extending in the opposite direction from lines 22, are generated by the second intertwined coil 23. The field lines are generated by induction so that the principal force causing breakdown of the PFCs and HFCs is the capture and vibration of these molecular species about magnetic flux lines with concomitant collisions with free electrons and ions localized by the field lines. The greater the current in the coils, the greater the breakdown, with the electrons and ions following the field lines through the chamber 11 as the gas flow stream 19 is propelled through the chamber by pressure generated in a connected pipe from a process tool. The pressure is sufficient to cause venting of the gases at gas outflow port 15. Current in the two coils oscillates at microwave frequencies where the oscillations of vibration are generated by microwave oscillators, including a first microwave oscillator 31 associated with waveguide 25 and a second microwave oscillator 33 associated with waveguide 27. While the two waveguides 25 and 27 are shown to be parallel to each other, they need not be parallel. Details of the energy coupling to the intertwined coils is more clearly seen with reference to FIG. 2.

With reference to FIG. 2, the first magnetron housing 35, containing a microwave oscillator such as a magnetron, is seen to support the first microwave waveguide 25. A second magnetron housing 37, containing an identical oscillator, i.e., magnetron, supports microwave waveguide 27. Each of the microwave oscillators has an antenna, not shown, which delivers microwave energy to the end of the waveguide distal to chamber 11. The dimensions of the waveguide are selected to provide a resonant cavity for the selected microwave frequency, typically 2450 MHz. Input power to the two microwave oscillators is 208 volts, single phase AC at 30 amps, 60 cycles. The microwave waveguides are fastened to the housings 35 and 37 by means of fastener eyes 36 through which bolts secure the waveguides to the housings.

At the ends of the microwave waveguides proximate to chamber 11, a first transformer core 38 and a second transformer core 39 project into the microwave waveguides 25 and 27 respectively. These cores are upright conductive fingers which are surrounded by a first impedance matching transformer 41 and a second impedance matching transformer 42, respectively. The impedance matching transformers are each connected to one of the two coils, while the two transformer cores couple energy from the waveguide through the core to the impedance matching transformers. The transformer cores each have a slot holding a portion of one turn of a coil while the surrounding transformer makes contact with an adjacent coil, pumping microwave energy into the adjacent coil distal to the core which terminates it. Thus, each core terminates one of the coils while microwave energy is pumped into the other coil. In this manner, each coil has a complete circuit from the microwave oscillator, through the waveguide, into a transformer core to an impedance matching transformer and thence to one end of the coil, while the opposite end of the coil is terminated in another transformer core and hence another transformer and a waveguide. This arrangement of cross-coupled magnetrons promotes frequency stability between the two oscillators, providing feedback from one oscillator to the other. The two coils terminate at spaced apart flanges which allow mounting of chamber 11 within a process gas flow stream. The two transformers and cores communicate with the two coils through openings in the flanges. Alternative terminations of each coil could be to ground through the chamber conductive body, or not connected at all, like an open transmission line.

A first high voltage ignitor feedthrough 43 contacts first core 38 for providing a high voltage path into chamber 11. Similarly, a second high voltage ignitor feedthrough 45 contacts core 39 in a similar manner. Each of the high voltage ignitor feedthroughs has an associated central electrode. For example, the first feedthrough 43 has a first electrode 47 while the second ignitor feedthrough 45 has a second electrode 49. These electrodes, when coupled to high voltage supplies, will transfer a spark to the coils in the inside of chamber 11. The spark within the chamber will ignite a gas plasma since the high voltage will tend to arc within the chamber. A plasma can be ignited when a sufficient number of gas particles are trapped along the flux lines forming a cloud in the central region of chamber 11. Since the field lines 19 pass through the center of the chamber, the plasma cloud will be centered within the chamber, i.e., in the cross sectional center of the chamber. Conditions within the chamber, such as temperature and pressure may be sensed by transducers inserted through sensor port 51 of the housing. The housing is held in place relative to a process tool gas outflow port by means of an interface flange 53 at each end of the housing. The flange resembles a standard vacuum flange. An insulative jacket 55 surrounds the coils within the housing. The insulative jacket may be made of a ceramic or other insulative material. This insulative material, as well as the coil material may be treated to provide a catalytic surface for PFC and HFC decomposition. An outer wall 57 may be a stainless steel outer shell which protects interior components from damage.

In the side view of FIG. 3, each waveguide 25 and 27 may be seen to be closed at an end distal to the intertwined coils 21 and 23. The closure of each waveguide is a conductive perforated panel which provides RF shielding while at the same time allowing ventilation of the waveguide. A similar closure is at the opposite end of each waveguide, but this is not seen in FIG. 3. The first and second transformer cores 38 and 39 are inside of the waveguide. A high voltage supply 61 supplies power to the magnetrons, as well as to the first and second electrodes 47 and 49 associated with the first and second ignitor feedthroughs 43 and 45, respectively. First and second instrumentation ports 63 and 65 may be seen opening into a chamber 11. These ports allow the insertion of temperature, pressure and other sensors described above that are needed to operate and control the gas plasma reactor.

With reference to FIG. 4, the microwave waveguide 27 is seen to straddle the magnetron housing 37 and a support 67 atop the rear flange of chamber 11. The chamber is connected to a process tool 75, as is the magnetron support 77 by means of fastener 79. The process tool 75 is one which emits HFCs and PFCs into chamber 11. The interface flange 53 is connected to a vacuum pump, the output of which is connected to a scrubber, not shown. Gas flowing from the process tool 75 into the central region of chamber 11 encounters the gaseous plasma and becomes part of the plasma displacing decomposed HFCs and PFCs which have been broken down into other compounds which are vented through interface flange 53 into a vacuum pump and scrubber, not shown. In this manner, deleterious HFCs and PFCs from process tools are converted by a gas plasma into conventional ash.

With reference to FIG. 5, the two microwave waveguides 25 and 27 are seen to be supported by magnetron housings 35 and 37 on one end and by cylindrical chamber 11 at the opposite ends. The waveguides are parallel to each other and perpendicular to the axis of the cylindrical chamber. While the waveguides are atop the cylindrical chamber and the oscillator housings, they also could be below. Both ends of chamber 11 have opposed flanges 53 and 54 which can be inserted in a process gas line. Note that the spacing of the waveguides 25 and 27 and the magnetron housings 35 and 37 correspond to the spacing of flanges 53 and 54. Typical overall dimensions of the reactor are 10 inches high by 10 inches wide by 9 inches long. The reactor is very compact for compatibility with existing process gas tools.

What is claimed is:

1. A process gas decomposition reactor comprising,
    a reactor chamber having a gas inflow port spaced apart from a gas outflow port in a manner defining a gas flow path through a central region of the chamber,
    a gas flow stream traversing the reactor chamber from the inflow port to the outflow port, the gas flow including process gas effluent and reaction gas,
    first and second intertwined helical coils surrounding the gas flow path,
    first and second spaced apart microwave frequency waveguides, exterior to the reaction chamber, each respectively joined to one of the first and second helical coils, and
    first and second microwave energy oscillators feeding respective first and second waveguides, each waveguide feeding microwave energy to a respective one of the first and second helical coils, wherein reactive gases in the reaction chamber are heated to ionization by said energy for breakdown of the process gas effluent and recombination with the reaction gas.

2. The reactor of claim 1 wherein the reactor chamber is a tubular structure connected co-axially with process gas piping.

3. The apparatus of claim 2 wherein the waveguides are elongated ducts of rectangular cross section having linear axes transverse to the axis of the reaction chamber.

4. The apparatus of claim 1 wherein said helical coils are within the reactor chamber.

5. The apparatus of claim 4 wherein a tubular insulative jacket is disposed coaxially with said helical coils between the coils and the reactor chamber thereby insulating said coils.

6. The apparatus of claim 1 wherein the microwave energy oscillators are magnetron tubes.

7. The apparatus of claim 6 wherein each magnetron is in an enclosed housing supporting one of the waveguides.

8. The apparatus of claim 1 wherein the intertwined helical coils have the same diameter.

9. The apparatus of claim 1 wherein the process gas effluent includes perfluorinated and hydrofluorocarbon compounds.

10. The apparatus of claim 1 wherein the reaction gas is selected from oxygen, hydrogen and water vapor.

11. The apparatus of claim 1 further defined by first and second impedance matching transformers connecting the first and second waveguides with the first and second coils.

12. The apparatus of claim 11 wherein each of said transformers is annular with a central axis having a conductive post extending through the center of each annulus, each conductive post projecting into a waveguide and connected to an end of one of the helical coils thereby coupling energy from the waveguide into the helical coil.

13. The apparatus of claim 12 wherein a high voltage bar is disposed to contact each conductive post, wherein the conductive post can ignite a gas plasma.

14. The apparatus of claim 1 wherein said waveguides having tuning stubs establishing resonance in the waveguides with said oscillators, thereby stabilizing the frequency of the oscillators.

15. A process gas decomposition reactor comprising, first and second coaxial intertwined helical coils insulated from each other and carrying current in opposite directions, first and second spaced apart microwave oscillators, first and second microwave waveguides electromagnetically connected between respective microwave oscillators and respective first and second helical coils, and a gas flow path defined by a cylindrical housing having a flow axis coaxial with the helical coils.

16. The reactor of claim 15 further defined by first and second transformers each having a core and a winding, the core projecting into a microwave waveguide thereby receiving microwave energy and contacting one of said coils.

17. The reactor of claim 16 wherein the core of each transformer is electromagnetically connected to one of said coils.

18. The reactor of claim 15 wherein said first and second coils are intertwined.

19. The reactor of claim 15 wherein said first and second waveguides are parallel to each other.

20. The reactor of claim 15 wherein said housing comprises coaxial members including an insulative structure supporting the coils.

21. The reactor of claim 15 wherein the housing has ends formed as flanges with peripheral bolt holes.

22. A process gas decomposition reactor comprising, a cylindrical reactor chamber having spaced apart mounting flanges for insertion in a process gas line, the chamber having an axis defining a gas flow path from one flange to the other, first and second intertwined helical coils coaxially surrounding the gas flow path, first and second housing containing microwave oscillators therein, the housings spaced apart a distance corresponding to the spacing of the mounting flanges for the chamber, first and second microwave frequency waveguides spaced apart a distance corresponding to the spacing of the mounting flanges of the chamber, the microwave oscillators communicating electromagnetic energy to the waveguides from the microwave oscillators which, in turn communicate with each of the coils, wherein the intertwined coils develop opposing magnetic flux lines parallel to the gas flow path causing electrons and ions spiraling about the flux lines to collide with gases traveling along the gas flow path thereby causing breakdown of said gases.

23. The apparatus of claim 22 wherein the microwave frequency waveguides are parallel to each other and perpendicular to the axis of the chamber.

24. The apparatus of claim 22 wherein the microwave frequency waveguides are atop the chamber and the microwave oscillator housings.

* * * * *